(12) United States Patent
Friesen et al.

(10) Patent No.: US 8,658,318 B2
(45) Date of Patent: Feb. 25, 2014

(54) ELECTROCHEMICAL CELL WITH ADDITIVE MODULATOR

(75) Inventors: Cody A. Friesen, Fort McDowell, AZ (US); Ramkumar Krishnan, Gilbert, AZ (US); Todd Trimble, Phoenix, AZ (US); Sergey Puzhaev, Scottsdale, AZ (US)

(73) Assignee: Fluidic, Inc., Scottsdale, AZ (US)

( * ) Notice: Subject to any disclaimer, the term of this patent is extended or adjusted under 35 U.S.C. 154(b) by 150 days.

(21) Appl. No.: 13/220,349

(22) Filed: Aug. 29, 2011

(65) Prior Publication Data

US 2012/0052404 A1 Mar. 1, 2012

Related U.S. Application Data

(60) Provisional application No. 61/378,021, filed on Aug. 30, 2010.

(51) Int. Cl.
*H01M 8/04* (2006.01)
*H01M 12/06* (2006.01)

(52) U.S. Cl.
USPC ............................ 429/403; 429/498; 429/516

(58) Field of Classification Search
USPC ......................................... 429/403, 498, 516
See application file for complete search history.

(56) References Cited

U.S. PATENT DOCUMENTS

| | | | |
|---|---|---|---|
| 4,585,710 A * | 4/1986 | McEvoy | 429/403 X |
| 2004/0053132 A1 | 3/2004 | Smedley et al. | |
| 2009/0284229 A1 | 11/2009 | Friesen et al. | |

FOREIGN PATENT DOCUMENTS

WO 2011/103142 A1 8/2011

OTHER PUBLICATIONS

Intl. Search Report/Written Opinion dated Nov. 16, 2011 of PCT/US2011/059558 dated Aug. 29, 2011 (11 pages).
Intl. Preliminary Report on Patentability dated Jan. 11, 2013 of PCT/US2011/059558 dated Aug. 29, 2011 (15 pages).

* cited by examiner

*Primary Examiner* — Stephen J. Kalafut
(74) *Attorney, Agent, or Firm* — Pillsbury Winthrop Shaw Pittman, LLP

(57) ABSTRACT

The present invention relates to an electrochemical cell for generating electrical power that includes an anode, a cathode, a charging electrode and an ionically conductive medium containing at least metal fuel ions and an additive for enhancing at least one electrochemical reaction in the cell. The cell also includes an additive sorbent material in contact with the ionically conductive medium that contains an excess amount of the additive, the sorbent material configured to release the excess additive to the ionically conductive medium as concentration of the additive in the ionically conductive medium is reduced during operation of the cell.

14 Claims, 12 Drawing Sheets

US 8,658,318 B2

ELECTROCHEMICAL CELL WITH ADDITIVE MODULATOR

This application claims priority to U.S. Provisional Application Ser. No. 61/378,021, incorporated herein in its entirety by reference.

FIELD

The present invention is generally related to an electrochemical cell for generating power using electrodeposited fuel that contains an additive for enhancing electrodeposition and/or extending capacity. The cell contains an additive sorbent material holding an excess of additive, configured to modulate the concentration of additive within the remainder of the cell.

BACKGROUND

Electrochemical cells/batteries utilize an electrolyte solution as an ionically conductive medium. In an electrochemical cell using metal as the fuel, the metal fuel is oxidized during discharge to reducible metal fuel ions at a fuel electrode functioning as an anode. During charging, the reducible metal fuel ions are reduced to metal fuel at the fuel electrode, which is now functioning as a cathode, so the metal fuel thus plates the fuel electrode through electrodeposition.

In some electrochemical cells, the electrolyte solution may comprise an additive. Examples of such devices are shown, for example, in U.S. patent application Ser. No. 13/028,496, citing U.S. Pat. No. 6,027,827 and U.S. Pat. No. 7,722,988, all of which are incorporated herein in their entirety. Various additives for different electrochemical systems may include nitrate, lithium iodide, carbon dioxide, and sulfur dioxide. As seen in U.S. patent application Ser. No. 13/028,496, a useful additive for some electrochemical cells may comprise poly (ethylene glycol) tetrahydrofurfuryl ("PEG-THF"). During operation of some cells containing additives, the concentration of the additive in the electrolyte may fluctuate depending on the amount of additive co-deposited during charging the metal fuel or released therefrom during discharging. Among other things, the present application provides a cell configured to modulate the concentration of additives in the electrolyte solution.

SUMMARY

One aspect of the invention provides an electrochemical cell comprising a fuel electrode for oxidizing a fuel, and an oxidant electrode for reducing an oxidant. The cell further comprises an ionically conductive medium for conducting ions between the fuel and oxidant electrodes, to support electrochemical reactions at those fuel and oxidant electrodes. The ionically conductive medium comprises at least one additive for enhancing at least one electrochemical reaction with the cell. The cell further comprises an additive sorbent material in contact with the ionically conductive medium. The additive sorbent material contains an excess amount of the additive. The additive sorbent material is configured to release the excess additive to the ionically conductive medium, as a concentration of the additive in the ionically conductive medium is depleted during operation of the cell.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
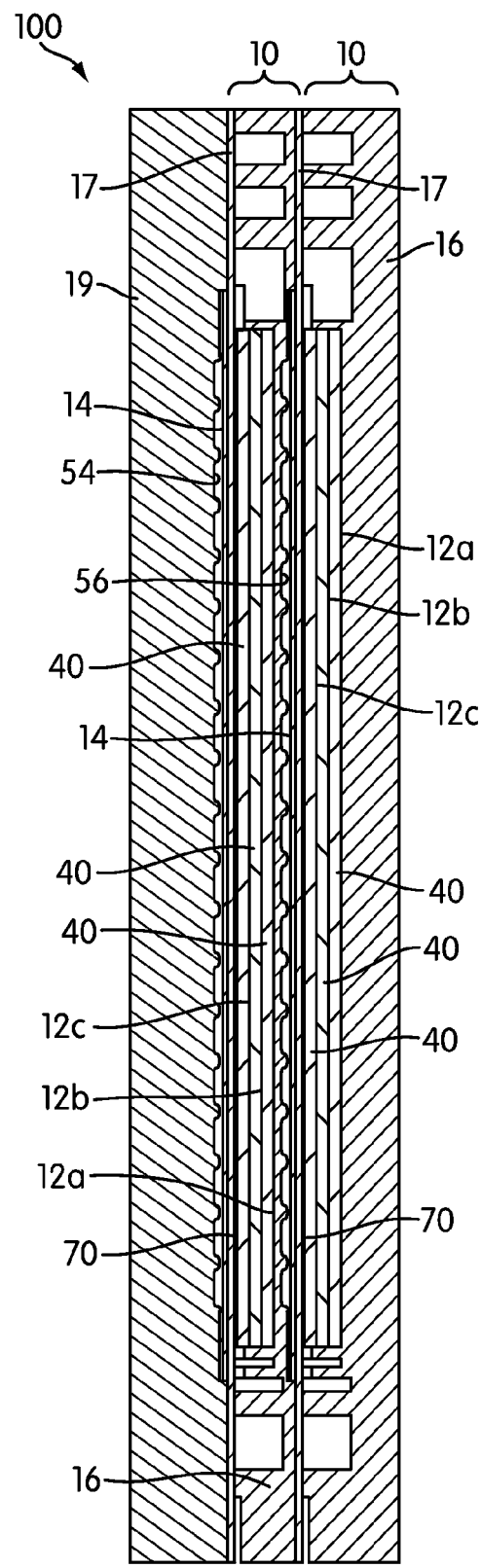
FIG. 1 illustrates a cross-sectional view of an electrochemical cell system that includes two electrochemical cells.
Figure 2:
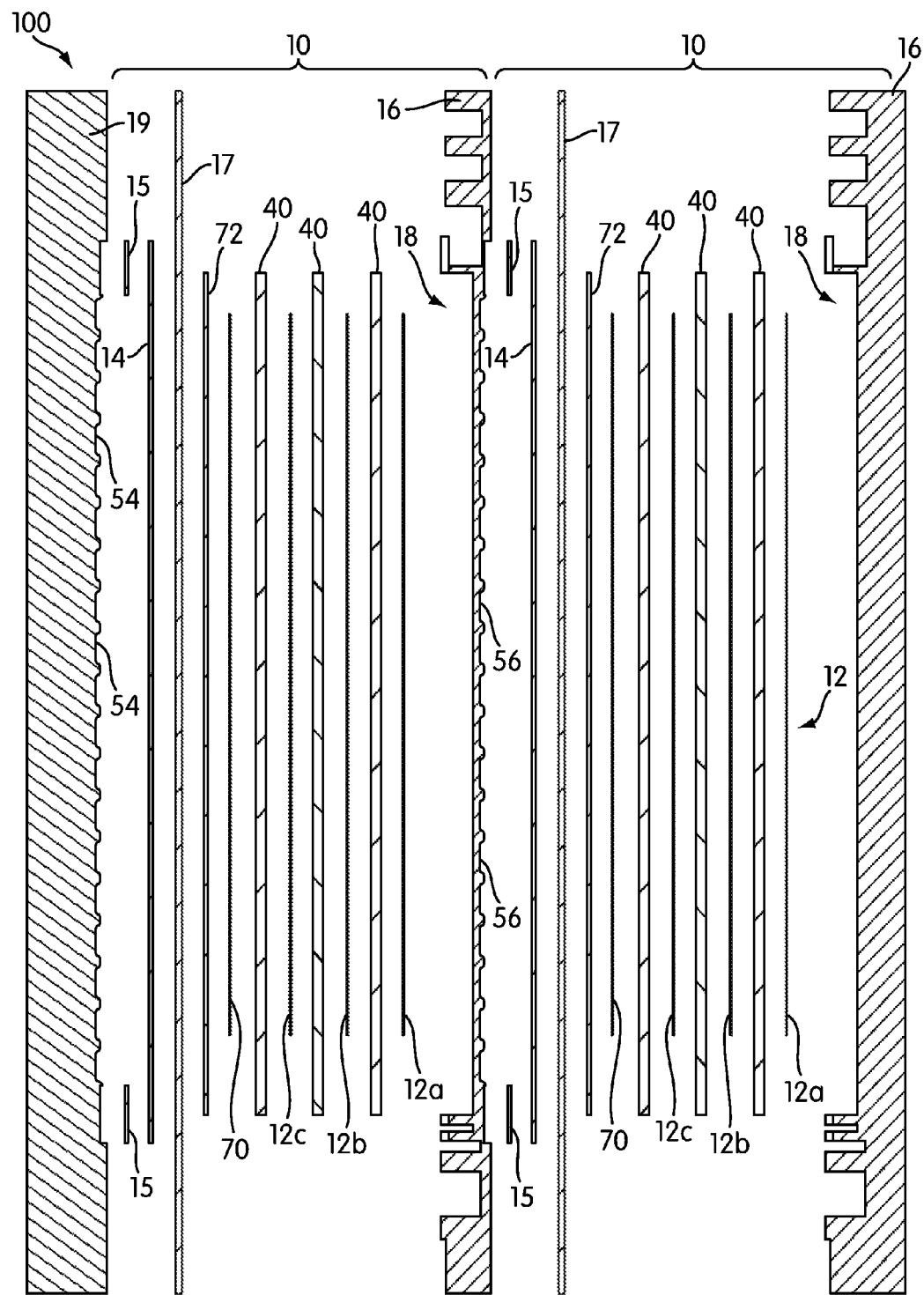
FIG. 2 illustrates an exploded view of the electrochemical cell system of FIG. 1.

FIGS. 1 and 2 illustrate an electrochemical cell system 100 that includes two electrochemical cells 10 configured to utilize a liquid ionically conductive medium therein, according to an embodiment of the invention. It may be appreciated that the electrochemical cell system 100 depicted herein is merely exemplary, and in other embodiments the functions or components of the electrochemical cells 10 or the electrochemical cell system 100 may vary. For example, in various embodiments, the ionically conductive medium may flow through multiple cells 10, or may circulate within a single cell 10. In some embodiments, the ionically conductive medium might generally not flow in the cell 10. It may be appreciated that portions of the electrochemical cell system 100, such as but not limited to one or more cells 10 therein, and/or the constituent portions thereof, may vary across embodiments. For example, various portions of each electrochemical cell 10 or other components of the electrochemical cell system 100 may be of any suitable structure or composition, including but not limited to being formed from plastic, metal, resin, or combinations thereof. Accordingly each cell 10 may be assembled in any manner, including being formed from a plurality of elements, being integrally molded, or so on. In various embodiments the cell(s) 10 and/or the housing(s) thereof may include elements or arrangements from one or more of U.S. patent application Ser. Nos. 12/385,217 (now U.S. Pat. No. 8,168,337), 12/385,489 (now U.S. Pat. No. 8,309,259), 12/549,617 (issue fee paid Jun. 11, 2013), 12/631,484, 12/776,962, 12/885,268, 13/028,496, 13/083,929, 61/358,339 (from which 13/167,930 now claims the benefit of), 61/383,510 (from which 13/230,549 now claims the benefit of), and 61/414,579 (from which 13/299,167 now claims the benefit of), each of which are incorporated herein in their entireties by reference. As depicted in the illustrated embodiment of FIG. 1, however, each cell 10 includes a first electrode 12, and a second electrode 14 that is spaced from the first electrode 12. The first electrode 12 supported by an electrode holder 16. The electrochemical system 100 also includes a cover 19 that is used to cover the electrochemical cells 10 on one side of the system 100, while one of the electrode holders 16 is used to cover the opposite side of the system 100, as illustrated in FIG. 1.

In an embodiment, the first electrode 12 is a metal fuel electrode that functions as an anode when the cell 10 operates in discharge, or electricity generating, mode, as discussed in further detail below. In an embodiment, the first electrode 12 may comprise a permeable electrode body 12a, such as a screen that is made of any formation able to capture and retain, through electrodepositing, or otherwise, particles or ions of metal fuel from an ionically conductive medium that circulates in the cell 10, as discussed in further detail below.

The fuel may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present invention is not intended to be limited to any specific fuel, and others may be used. The fuel may be provided to the cell 10 as particles suspended in the ionically conductive medium.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. The medium may also use a non-aqueous solvent or an ionic liquid. In the non-limiting embodiment described herein, the medium is an aqueous solution comprising potassium hydroxide.

The fuel may be oxidized at the first electrode 12 when the first electrode 12 is operating as an anode, and an oxidizer, such as oxygen, may be reduced at the second electrode 14 when the second electrode 14 is operating as a cathode, which is when the cell 10 is connected to a load and the cell 10 is in discharge or electricity generation mode, as discussed in further detail below. The reactions that occur during discharge mode generate by-product precipitates, e.g., a reducible fuel species, in the ionically conductive medium. For example, in embodiments where the fuel is zinc, zinc oxide is generated as a by-product precipitate/reducible fuel species. During a recharge mode, which is discussed in further detail below, the by-product precipitates, e.g., zinc oxide, may be reversibly reduced and deposited as the fuel, e.g., zinc, onto the first electrode 12, which functions as a cathode during recharge mode. During recharge mode, either the second electrode 14, or a separate charging electrode 70, described below, functions as the anode. The switching between discharge and recharge modes is discussed in further detail below.

Figure 3:
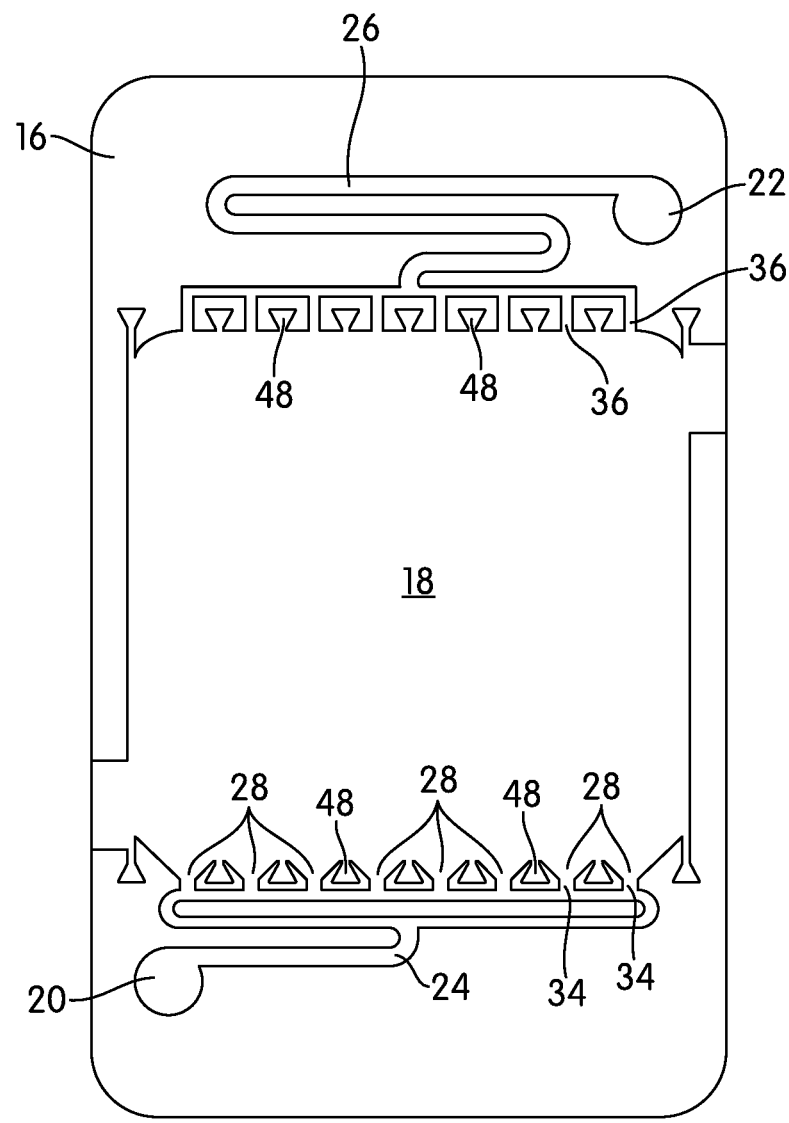
FIG. 3 illustrates an electrode holder of one of the electrochemical cells of FIG. 1.

The electrode holder 16 defines a cavity 18 in which the first electrode 12 is held. The electrode holder 16 also defines an inlet 20 and an outlet 22 for the cell 10. The inlet 20 is configured to allow the ionically conductive medium to enter the cell 10 and/or recirculate through the cell 10. The inlet 20 may be connected to the cavity 18 via an inlet channel 24, and the outlet 22 may be connected to the cavity 18 via an outlet channel 26. As illustrated in FIG. 3, the inlet channel 24 and the outlet channel 26 may each provide a meandering tortuous path through which the ionically conductive medium may flow. The meandering path defined by the inlet channel 24 preferably does not include any sharp corners in which the flow of the medium may become stagnated or in which any particulates in the medium may collect. As discussed in further detail below, the length of the channels 24, 26 may be designed to provide an increased ionic resistance between cells that are fluidly connected in series.

For each cell 10, a permeable seal member 17 may be bonded between sealing surfaces on the electrode holders 16 and/or the cover 19, as appropriate, to enclose at least the fuel electrode 12 in the cavity 18. The seal member 17 also covers the inlet and outlet channels 24, 26. The seal member 17 is non-conductive and electrochemically inert, and is preferably designed to be permeable to the ionically conductive medium in the orthogonal direction (i.e., through its thickness), without permitting lateral transport of the ionically conductive medium. This enables the ionically conductive medium to permeate through the seal member 17 for enabling ion conductivity with the second electrode 14 on the opposing side to support the electrochemical reactions, without "wicking" the ionically conductive medium laterally outwardly from the cell 10. A few non-limiting examples of a suitable material for the seal member 17 are EPDM and polytetraflouroethylene (such as that marketed as TEFLON® PTFE).

In the illustrated embodiment, the cavity 18 has a generally rectangular, or square, cross-section that substantially matches the shape of the first electrode 12. One side of the cavity 18, specifically, the side of the cavity 18 that is connected to the inlet channel 24, includes a plurality of fluidization zones 28 that are each connected to the inlet channel 24 via a manifold that includes a plurality of cavity inlets 34 so that when the ionically conductive medium and precipitates or reducible fuel species enter the cavity 18, the ionically conductive medium and fuel enter the fluidization zones 28. As shown in greater detail in FIG. 7, each fluidization zone 28 is partially defined by two surfaces 30, 32 that are angled with respect to each other but do not touch each other so as to define diverging surfaces with respect to an axis that extends from the inlet 34 through the center of the fluidization zone 28. In the illustrated embodiment, the surfaces 30, 32 substantially define a "V" with an open bottom that is open to the inlet 34, as illustrated in FIG. 3. Although the illustrated embodiment shows the surfaces 30, 32 as being relatively straight, the surfaces may be curved or partially curved, so long as the surfaces 30, 32 are diverging from the inlet 34.

Figure 7:
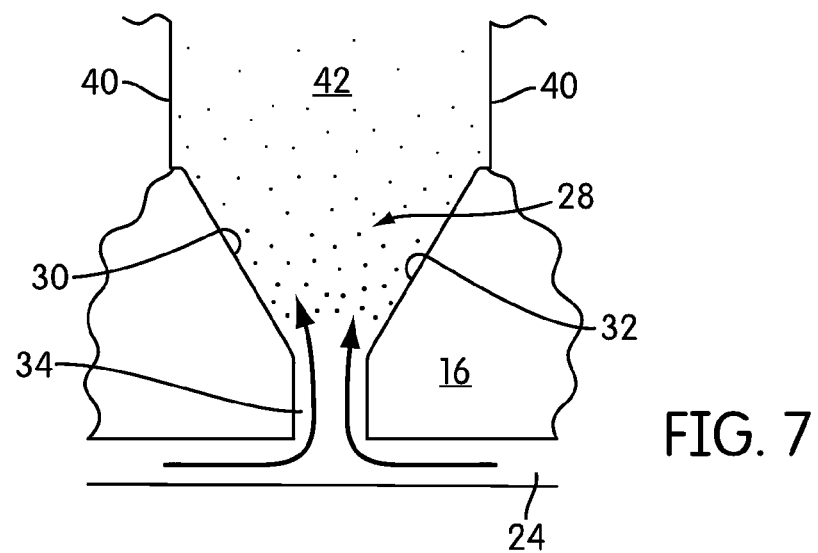
FIG. 7 illustrates a fluidization zone defined in part by the electrode holder of FIG. 3 in greater detail.

The fluidization zones 28 are configured so that as the ionically conductive medium with particulates flows into the cavity 18 via the inlet channel 24, the particulates are fluidized in the ionically conductive medium, which allows for the particulates to be more evenly dispersed in the ionically conductive medium as the ionically conductive medium contacts the first electrode 12. This is particularly advantageous when the electrochemical cell 10 is oriented with the open bottom of the V-shaped fluidization zones 28 is pointed downward, as illustrated in FIG. 7. This is because gravity will tend to cause the particulates to accumulate at the inlet end of the cavity 18 between the inlet channel 24 and the outlet channel 26. By fluidizing the particulates in the ionically conductive medium, and by providing a pressure drop across the cavity 18, as discussed in further detail below, the particulates will flow more evenly across the cavity 18, with substantially less or no accumulation at the inlet end of the cavity 18. This may improve the efficiency of the cell 10 by providing a more even distribution of the particulates across the surface of the first electrode 12.

Figure 4:
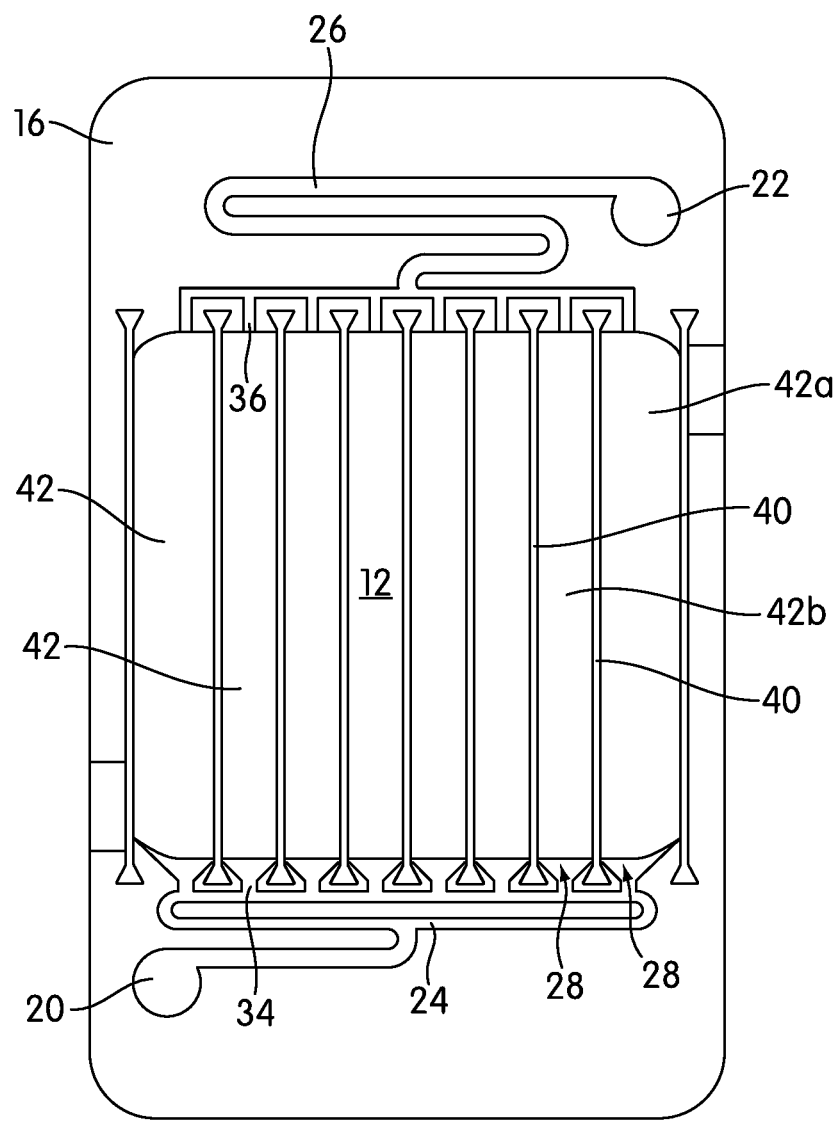
FIG. 4 illustrates the electrode holder of FIG. 3 holding a first electrode and a plurality of spacers connected to the electrode holder.

As illustrated in FIG. 4, a plurality of spacers 40, each of which extends across the first electrode 12 in a spaced relation to each other, are connected to the electrode holder 16 so that the first electrode 12 may be held in place relative to the electrode holder 16 and to the second electrode 14. In an embodiment, the first electrode 12 may contain a plurality of permeable electrode bodies 12a-12c, as illustrated in FIG. 2, that may be separated by sets of the plurality of spacers 40, so that each set of spacers 40 is positioned in between adjacent electrode bodies to electrically isolate the electrode bodies 12a-12c from each other. Within each set of spacers 40 between adjacent electrode bodies, the spacers 40 are positioned in a spaced relation in a manner that creates so-called "flow lanes" 42 therebetween, as discussed in greater detail below. The flow lanes 42 are three-dimensional and have a height that is substantially equal to the height of the spacers 40. In an embodiment, the spacers may be provided by a single frame that has cut-outs corresponding to the flow lanes. In an embodiment, the flow lanes may include a foam or honeycomb-type structure that is configured to allow the ionically conductive medium to flow therethrough. In an embodiment, the flow lanes may include an array of pins that are configured to disrupt the flow of the ionically conductive medium through the flow lanes. The illustrated embodiment is not intended to by limiting in any way.

The spacers 40 are non-conductive and electrochemically inert so they are inactive with regard to the electrochemical reactions in the cell 10. The spacers 40 are preferably sized so that when they are connected to the electrode holder 16, the spacers 40 are in tension, which allows the spacers 40 to press against the first electrode 12, or one of the electrode bodies 12a-12c, so as to hold the first electrode 12 or bodies thereof in a flat relation relative to the electrode holder 16. The spacers 40 may be made from a plastic material, such as polypropylene, polyethylene, noryl, fluoropolymer, etc. that allows the spacers 40 to be connected to the electrode holder 16 in tension.

Figure 5:
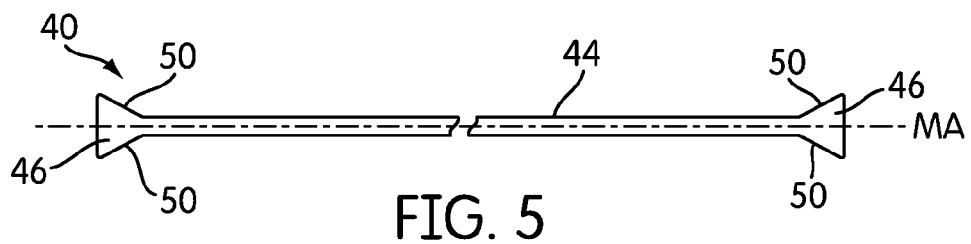
FIG. 5 illustrates one of the spacers of FIG. 4 in greater detail.
Figure 6:
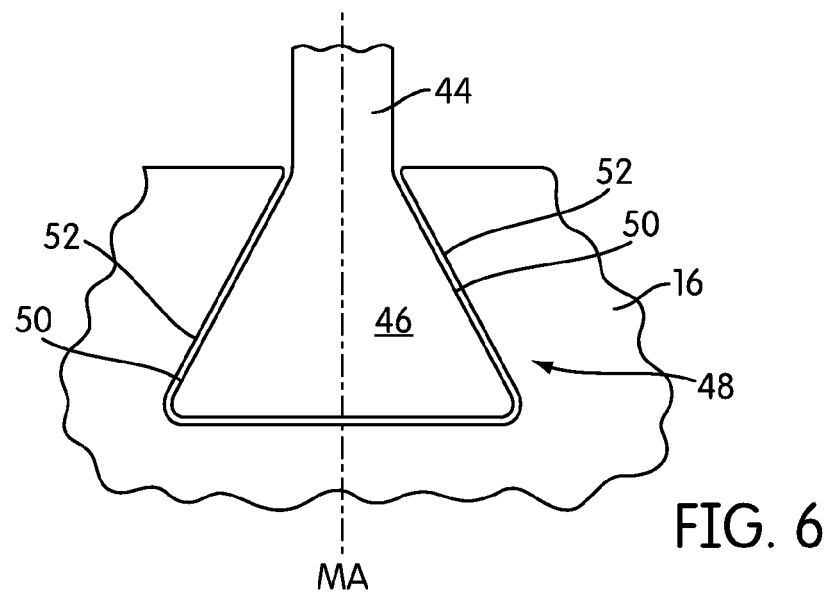
FIG. 6 illustrates a connection between the spacer of FIG. 5 and the electrode holder of FIG. 3 in greater detail.

In the embodiment illustrated in FIG. 5, each spacer has an elongated middle portion 44, and a shaped connecting portion 46 at each end. The shaped connecting portions 46 are configured to be held by openings 48 having substantially similar shapes in the electrode holder 16, as illustrated in FIG. 6. In the illustrated embodiment, the shaped portions 46 and the openings 48 have a substantially triangular shape, although the illustrated shape is not intended to be limiting in any way. The substantially triangular shape provides surfaces 50 on opposite sides of the elongated portion 44 of the spacer 40 that are configured to contact corresponding surfaces 52 on the electrode holder 16. Because the surfaces 50, 52 are angled with respect to a major axis MA of the elongated portion 44 of the spacer 40 and the tension in the spacer 40 will be along the major axis MA, the forces created by the tension may be distributed across a larger surface, as compared to a shaped portion having a circular or square shape with the same area.

Once the spacers 40 have been connected to the electrode holder 16 via the end portions 46, the flow lanes 42 are defined across the cavity 18 of the electrode holder 16. The spacers 40 are configured to essentially seal off one flow lane 42a from an adjacent flow lane 42b, that is separated by one of the spacers 40 so that the ionically conductive medium is guided to generally flow in substantially one direction. Specifically, the ionically conductive medium may generally flow in a first direction FD across the first electrode 12, from the inlet channel 24 to the outlet channel 26. A suitable pressure drop is generated between the inlet channel 24 and the fluidization zones 28 so that the ionically conductive medium may flow across the cavity 18 and to the outlet channel 26, even when the cell 10 is oriented such that the flow is substantially upward and against gravity. In an embodiment, the ionically conductive medium may also permeate through the first electrode 12, or an individual permeable electrode body 12a-12c, in a second direction SD and into a flow lane that is on the opposite side of the first electrode 12 or permeable electrode body 12a-12c.

Figure 8:
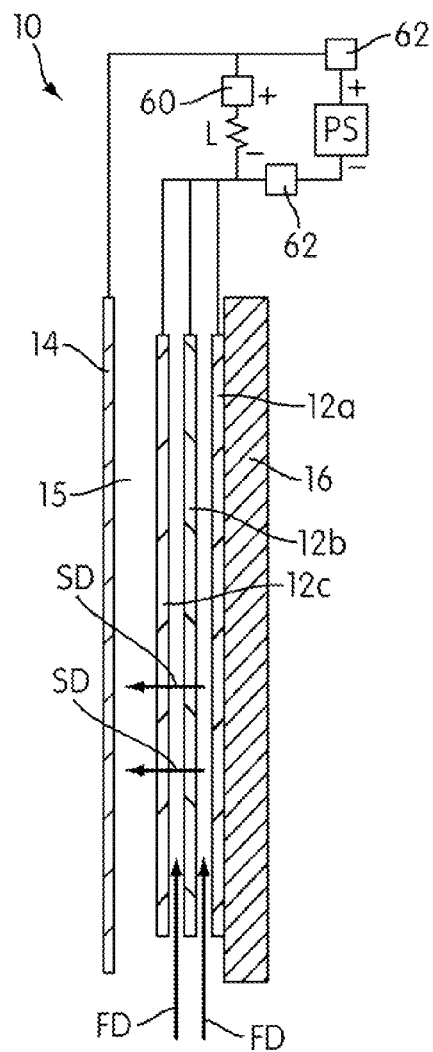
FIG. 8 schematically illustrates electrical connections between the electrochemical cell and an external load and a power supply according to an embodiment of the present invention.

As illustrated in FIG. 8, the first electrode 12 is connected to an external load L so that electrons given off by the fuel as the fuel is oxidized at the first electrode 12 flow to the external load L. The external load L may be coupled to each of the permeable electrode bodies 12a-12c in parallel, as described in detail in U.S. patent application Ser. No. 12/385,489, filed on Apr. 9, 2009 and incorporated herein by reference.

The second electrode 14 functions as a cathode when the second electrode 14 is connected to the external load L and the cell 10 operates in discharge mode. When functioning as a cathode, the second electrode 14 is configured to receive electrons from the external load L and reduce an oxidizer that contacts the second electrode 14. In an embodiment, the second electrode 14 comprises an air breathing electrode and the oxidizer comprises oxygen in the surrounding air.

The oxidizer may be delivered to the second electrode 14 by a passive transport system. For example, where oxygen present in ambient air is the oxidizer, simply exposing the second electrode 14 to ambient air via openings in the cell, such as the openings that are provided by grooves 54 in the cover 19 and grooves 56 in the electrode holder 16 provided in the center of the electrochemical cell system 100, may be sufficient to allow diffusion/permeation of oxygen into the second electrode 14. Other suitable oxidizers may be used and embodiments described herein are not limited to the use of oxygen as the oxidizer. A peripheral gasket 15 may be positioned between the periphery of the second electrode 14 and the cover 19 or electrode holder 16, as appropriate, to prevent the ionically conductive medium from leaking around the second electrode 14 and into the area in the grooves 54, 56 for air exposure.

In other embodiments, an oxidizer pump, such as an air blower, may be used to deliver the oxidizer to the second electrode 14 under pressure. The oxidizer source may be a contained source of oxidizer. Likewise, when the oxidizer is oxygen from ambient air, the oxidizer source may be broadly regarded as the delivery mechanism, whether it be passive or active (e.g., pumps, blowers, etc.), by which the air is permitted to flow to the second electrode 14. Thus, the term "oxidizer source" is intended to encompass both contained oxidizers and/or arrangements for passively or actively delivering oxygen from ambient air to the second electrode 14.

Electricity that can be drawn by the external load L is generated when the oxidizer at the second electrode 14 is reduced, while the fuel at the first electrode 12 is oxidized to an oxidized form. The electrical potential of the cell 10 is depleted once the fuel at the first electrode 12 is entirely oxidized or oxidation is arrested due to passivation of the fuel electrode. A switch 60 may be positioned in between the second electrode 14 and the load L so that the second electrode 14 may be connected and disconnected from the load L, as desired.

To limit or suppress hydrogen evolution at the first electrode 12 during discharge mode and during quiescent (open circuit) periods of time, salts may be added to retard such a reaction. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution.

After the fuel in the cell 10 has been entirely oxidized, or whenever it is desirable to regenerate the fuel within the cell 10 by reducing the oxidized fuel ions back to fuel, the first electrode 12 and the second electrode 14 may be decoupled from the external load L and coupled to a power supply PS with the use of suitable switches 62, as illustrated in FIG. 8. The power supply PS is configured to charge the cell 10 by applying a potential difference between the first electrode 12 and the second electrode 14 such that the reducible species of the fuel is reduced and electrodeposited onto the permeable electrode bodies 12a-12c and the corresponding oxidation reaction takes place at the second electrode 14, which is typically oxidation of an oxidizable species to evolve oxygen, which may be off-gassed from the cell 10. As described in detail in U.S. patent application Ser. No. 12/385,489, filed on Apr. 9, 2009 and incorporated herein by reference, only one of the permeable electrode bodies, such as 12a, may be connected to the power supply PS so that the fuel reduces onto the permeable electrode body and progressively grows to and on the other permeable electrode bodies 12b-12c, one by one. The switches 62 may control when the cell 10 operates in discharge mode and in charge mode.

Any suitable control mechanism may be provided to control the action of the switches 62 between the open and closed positions. For example, a relay switch that is biased toward the open position may be used, with an inductive coil coupled to the power supply that causes closure of the switch when charging begins. Further, a more complex switch that allows for individual connection to the permeable electrode bodies 12a-12c could be used to provide the connection/disconnection to and from the load, and to and from each other.

Figure 9:
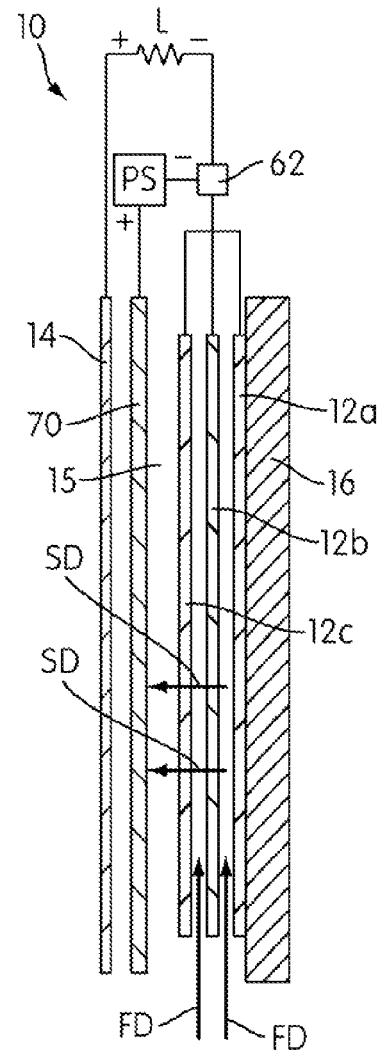
FIG. 9 schematically illustrates electrical connections between the electrochemical cell and an external load and a power supply according to an embodiment of the present invention.

FIG. 9 shows an embodiment where a third electrode 70 is provided to function as the charging electrode, rather than the second electrode 14. As illustrated in FIG. 2, the third electrode 70 may be positioned between the first electrode 12 and the second electrode 14, with a spacer 72 and the seal member 17 being positioned between the third electrode 70 and the second electrode 14. The spacer 72 is non-conductive and has openings through which the ionically conductive medium may flow.

In the embodiment described above with respect to FIG. 8, the second electrode 14 functions as the cathode during power generation/discharge, and as the anode during charging, as described above. In FIG. 9, the load is coupled in parallel to each of the permeable electrode bodies 12a-12c of the first electrode 12, and also to the third electrode 70 during recharge. During current generation, the fuel on the first electrode 12 is oxidized, generating electrons that are conducted to power the load L and then conducted to the second electrode 14 for reduction of the oxidizer (as discussed in more detail above).

It is also possible in any of the embodiments of the invention to apply the cathodic potential simultaneously to all the electrode bodies 12a-12c of the first electrode 12, rather than to just one to produce body-by-body progressive growth. Progressive growth emanating from one body is advantageous because it provides more density. Specifically, the growth in the previously connected electrode bodies continues as each subsequent body is connected by the progressing growth. With all the electrode bodies subject to the same potential, the growth will only occur until a short occurs between the charging electrode, which is the second electrode 14 in the embodiment of FIG. 8 and the third electrode 70 in the embodiment of FIG. 9, and the electrode body proximate to it. Thus, it is possible to have a faster, but less dense, growth in this manner, which may be amenable to certain re-charging needs.

The embodiments illustrated in FIGS. 8 and 9 should not be considered to be limiting in any way and are provided as non-limiting examples of how the cell 10 may be configured to be rechargeable. United States Patent Application Publication No. 2011/0070506, the entire content of which is incorporated herein by reference, describes embodiments of a rechargeable electrochemical cell system with charge/discharge mode switching in the cells.

Returning to FIG. 4, after the ionically conductive medium has passed through the first electrode 12, the medium may flow into the outlet channel 26 that is connected to the outlets 36 of the cavity 18 of the electrode holder 16 and the outlet 22. The outlet 22 may be connected to the inlet 20 in embodiments where the medium is recirculated in the cell 10, or to an inlet of an adjacent cell, as discussed in further detail below, when a plurality of cells 10 are fluidly connected in series. In an embodiment, the outlet 22 may be connected to a vessel to collect the medium that has been used in the cell 10.

The cells 10 illustrated in FIGS. 1 and 2 may be fluidly connected in series. Details of embodiments of cells that are connected in series are provided in U.S. patent application Ser. No. 12/631,484, filed Dec. 4, 2009 and incorporated herein by reference in its entirety. The outlet 22 of a first cell 10 may be fluidly connected to the inlet 20 of a second cell 10, and the outlet 22 of the second cell 10 may be connected to the inlet 20 of a third cell, and so on. Although the embodiment of FIGS. 1 and 2 illustrates two cells 10, additional cells may be stacked and fluidly connected to the illustrated cells. Due to the meandering, tortuous paths that are created by the inlet channel 24 and the outlet channel 26, described above and illustrated in FIGS. 3 and 4, the length of the flow passageways for the medium via the channels 24, 26 is greater than the distance between the first electrode 12 and the second electrode 14 in each of the cells 10. This creates an ionic resistance between the pair of fluidly connected cells that is greater than an ionic resistance within an individual cell 10. This may reduce or minimize internal ionic resistance loss of the stack of cells 100, as discussed in U.S. patent application Ser. No. 12/631,484.

In operation, the first electrode 12, which already has metal fuel deposited thereon, is connected to the load L and the second electrode 14 is connected to the load L. The ionically conductive medium enters the inlet 20 under positive pressure and flows through the inlet channel 24, the inlets 34 of the cavity 18, and into the fluidization zones 28 of the flow lanes 42. The ionically conductive medium flows across the permeable electrode bodies 12a-12c in the flow lanes 42 defined by the elongated middle portions 22 of the spacers 40. The ionically conductive medium may also permeate through the permeable electrode bodies 12a-12c of the first electrode 12. The ionically conductive medium simultaneously contacts the first electrode 12 and the second electrode 14, thereby allowing the fuel to oxidize and conduct electrons to the load L, while the oxidizer is reduced at the second electrode 14 via the electrons that are conducted to the second electrode 14 by the load L. After the ionically conductive medium has passed through the flow lanes 42, the medium flows out of the cavity 18 via the outlets 36 of the cavity 18, through the outlet channel 24, and out the outlet 22 of the cell 10.

When the fuel has been depleted or when it is otherwise desirable to recharge the cell 10, the first electrode 12 is connected to the negative terminal of the power supply PS and the charging electrode, which is the second electrode 14 in the embodiment illustrated in FIG. 8 and the third electrode 70 in the embodiment illustrated in FIG. 9, is connected to the positive terminal of the power supply PS. In the charging or recharge mode, the first electrode 12 becomes the cathode and the charging electrode 14, 70 becomes the anode. By providing electrons to the first electrode 12, fuel ions may reduce into fuel and redeposit onto the permeable electrode bodies 12a-12c while the ionically conductive medium circulates through the cell 10 in the same manner as described above with respect to the discharge mode.

The flow lanes 42 provide directionality and distribution of the ionically conductive medium across the first electrode 12. The fluidization zones 28 agitate the particulates and precipitates that have been formed during discharge mode of the cell 10 within the ionically conductive medium and prevent the particulates from settling out of the medium at the bottom of the cavity, which allows the particulates to flow with the ionically conductive medium across the first electrode 12. The flow lanes 42 may also prevent the particulates from settling and/or covering the electrodes. When the cell 10 is in charging mode, the improved distribution of the particulates across the first electrode 12 allow for a more uniform deposition of the reduced fuel onto the first electrode 12, which improves the density of the fuel on the first electrode 12, and increases the capacity and energy density of the cell 10, thereby enhancing the cycle-life of the cell 10. In addition, by having the ability to control the distribution of the precipitates or reaction by-product during discharge, early passivation/deposition of the by-product on the first electrode 12 may be prevented. Passivation leads to lower fuel utilization and lower cycle life, which is undesirable.

Embodiments of the present invention are not limited to the management of the reaction by-product that is generated during discharge mode, as described above, and reversibly reduced and electrodeposited as the fuel during recharge. Rather, embodiments of the present invention can be used where the reducible fuel species is different from the reaction by-product and is supplied separately.

Many electrochemical cells having an ionically conductive medium that flows through the cell (including but not limited to the electrochemical cell 10 described above, as well as those described in U.S. Patent Application Publications 2011/0086278 and 2011/0189551, and U.S. patent application Ser. No. 13/028,496, all of which are incorporated herein by reference) may be modified so that the ionically conductive medium may comprise at least one additive that may enhance at least one electrochemical reaction within those cells. For example, as depicted in U.S. patent application Ser. No. 13/028,496, an additive such as PEG-THF may enhance the electrodeposition of fuel on the first electrode 12 during charging of the cell 10, resulting in fuel growth that is denser than the more porous dendritic growth produced in reactions unaided by the at least one additive. Although reference will be made to the cell 10 described herein, the present invention may apply to any cell within the spirit and scope of the appended claims.

In an embodiment of the present invention wherein the ionically conductive medium of the cell 10 comprises at least one additive, the at least one additive may be of a type wherein the concentration of the additive in the ionically conductive medium is depleted during operation of the cell. As an example, during charging of the cell 10, wherein fuel is electrodeposited on the fuel or first electrode 12, the additive may be deposited with the fuel onto the first electrode 12, thus removing or depleting some of the additive from the ionically conductive medium. In an embodiment, the additive may be released back into the ionically conductive medium during consumption of the fuel while the cell 10 is in its discharge or current producing mode. That is, as the fuel is oxidized during discharge, the additive may be released back into the medium.

In some embodiments, it may be preferable that the concentration of the additive in the ionically conductive medium remain within a predetermined concentration range regardless of the amount of additive that has been electrodeposited with the fuel onto the first electrode 12. For example, if the amount of additive in the ionically conductive medium decreases during the charging process, while the fuel is electrodeposited onto the first electrode 12, the fuel growth at the end of the charging process may be less dense than would occur at the beginning of the charging process, when the preferred concentration of additive is in the ionically conductive medium. That is, the amount of additive present may be depleted during the charging process such that it is less effective at the beginning than towards the end (for whatever function it may perform). For a more specific example, where the additive is PEG-THF, and the metal fuel is zinc that is formed from the reduction of reducible zinc ions in the ionically conductive medium, the additive may function best when its concentration in the ionically conductive medium is between 0.5 mL/L and 4.0 mL/L.

For this and other reasons, it may be desirable that the cell be configured to maintain a concentration of additive within a desired range, regardless of the amount of additive that has been electrodeposited with the metal fuel (and thus depleted from the ionically conductive medium). As seen schematically in the embodiments of the electrochemical cell system 100 in FIG. 10 A-C, the concentration of additive may be maintained through the use of an additive modulator 80. The additive modulator 80 in such systems may be configured to hold and release an excess quantity of additive into the ionically conductive medium when the additive in the ionically conductive medium is depleted during operation of the cell 10. In an embodiment, the additive modulator 80 may do this by being located along the flow path of the ionically conductive medium.

In an embodiment, the quantity of excess additive held by the additive modulator 80 may be configured to maintain a general proportional equilibrium with the additive concentration in the ionically conductive medium. For example, as the additive is depleted from the ionically conductive medium, such as when it is plated with the fuel on the first electrode 12, the additive modulator 80 may release some of the excess additive into the ionically conductive medium, thus modulating the concentration of additive in the ionically conductive medium. Furthermore, during discharge, when the fuel on the first electrode 12 is consumed and oxidized to reducible fuel ions in the ionically conductive medium, resulting in the release of the additive from the first electrode 12 back into the ionically conductive medium, the additive modulator 80 may absorb or adsorb some of the excess additive, again modulating the concentration of additive in the ionically conductive medium to the predetermined levels.

The additive modulator 80 may be of any suitable construction or configuration to accomplish this modulation, including but not limited to comprising an additive sorbent material 85. In an embodiment, the additive sorbent material 85 may recover liquids through the mechanisms of absorption, adsorption, or both. The additive sorbent material 85 may comprise a sequester media having a large surface area configured to hold the excess of additive. In an embodiment, the additive sorbent material 85 may be configured to contain an excess of 1.5-5.0× the amount of additive elsewhere in the electrolyte. As non-limiting examples, in an embodiment the additive sorbent material 85 may comprise activated carbon or carbon black. In other non-limiting embodiments, the additive sorbent material 85 may comprise a suitable aerogel, including but not limited to those formed from silica or carbon.

Figure 10C:
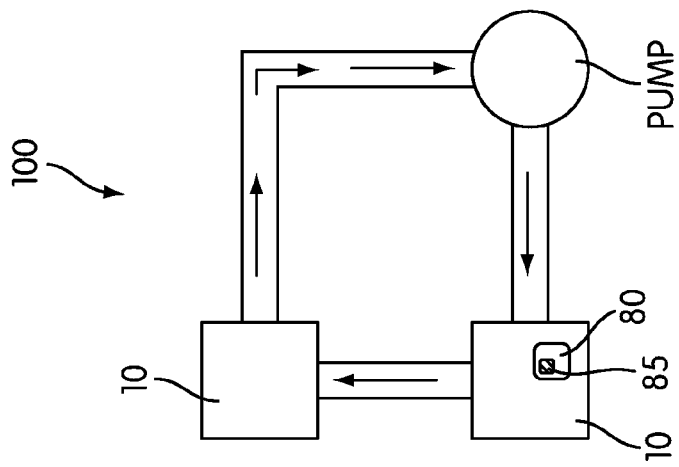
FIGS. 10A-C show schematic views of alternative embodiments of electrochemical cell systems of the present invention, showing flow channels for circulating an electrolyte therein.
Figure 10B:
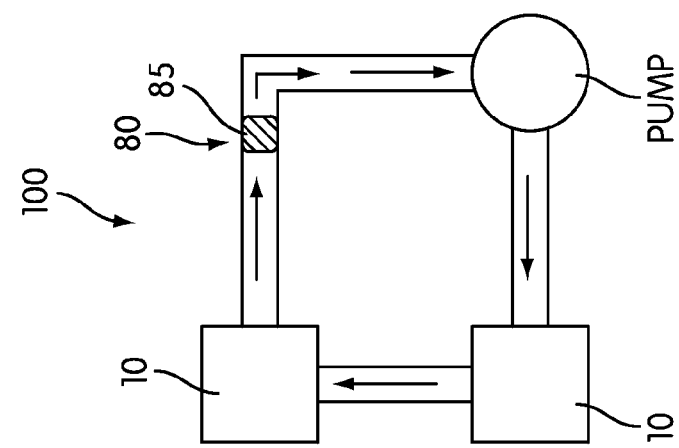
Figure 10A:
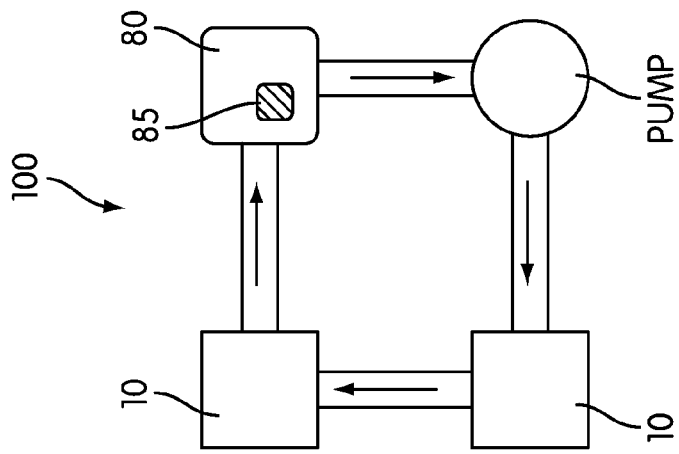

As FIGS. 10 A-C show, the additive modulator 80 may be placed directly in the flow path of the ionically conductive medium. In the embodiment of FIG. 10A, the additive modulator 80 may be a separate body that is connected to the cells 10 in the flow path by the flow connectors. As seen in FIG. 10B, the additive modulator 80 may in an embodiment be placed inside the flow connectors themselves. In the illustrated embodiments of FIGS. 10A and 10B, wherein the ionically conductive medium is pumped through a plurality of cells 10 via a common pump, the additive modulator 80 is placed outside of the cells 10. In another embodiment, as seen in FIG. 10C, the additive modulator 80 may also be inside one or more of the cells 10. In another embodiment (not shown), the additive modulator 80 may be a part of the pump. In other embodiments, there may be multiple additive modulators 80 in the cell system 100. The placement of the additive modulator 80 anywhere within the flow path of the ionically conductive medium is within the scope of the present invention.

Depending on the interaction between the flow and the additive modulator 80, such as the degree to which the presence of the additive modulator 80 might slow the flow of the ionically conductive medium, the additive modulator 80 may in an embodiment completely screen the flow path. As seen in the illustrated embodiment of FIG. 11, the additive modulator 80 may house the additive sorbent material 85 inside a reservoir 90. The reservoir 90 may contain a reservoir base 92 covered by a reservoir cap 94. The reservoir 90 may also have a flow inlet 96, and a flow outlet 98.

As shown, the ionically conductive medium may flow into the flow inlet 96 in the reservoir cap 94, which provides a path into the reservoir base 92. In an embodiment the additive sorbent material 85 may be formed as a hollow body inside the reservoir base 92, having a single open end receiving the flow inlet 96, wherein the hollow space therein defines a pre-modulated portion 105 of the reservoir 90. In such an embodiment the ionically conductive medium would enter the pre-modulated portion 105 and would flow through the additive sorbent material 85 into a post-modulated portion 110 of the reservoir 90, between the additive sorbent material 85 and the flow outlet 98. As the ionically conductive medium passes through the additive sorbent material 85, a deficiency of additive in the ionically conductive medium would result in an excess of additive in the additive sorbent material 85 being released into the ionically conductive medium. Likewise, an abundance of additive in the ionically conductive medium would result in the additive sorbent material 85 absorbing or adsorbing the abundance to modulate the concentration of additive in the medium. In other words, the concentration gradient dictates the modulation of the additive. In an embodiment, the additive sorbent material 85 may be contained inside a screening material 115. The screening material 115 may be of any construction or configuration, including but not limited to a porous body such as fabric or mesh, which permits the flow of ionically conductive medium and at least one additive therethrough without permitting the movement of the additive sorbent material 85.

Figure 12:
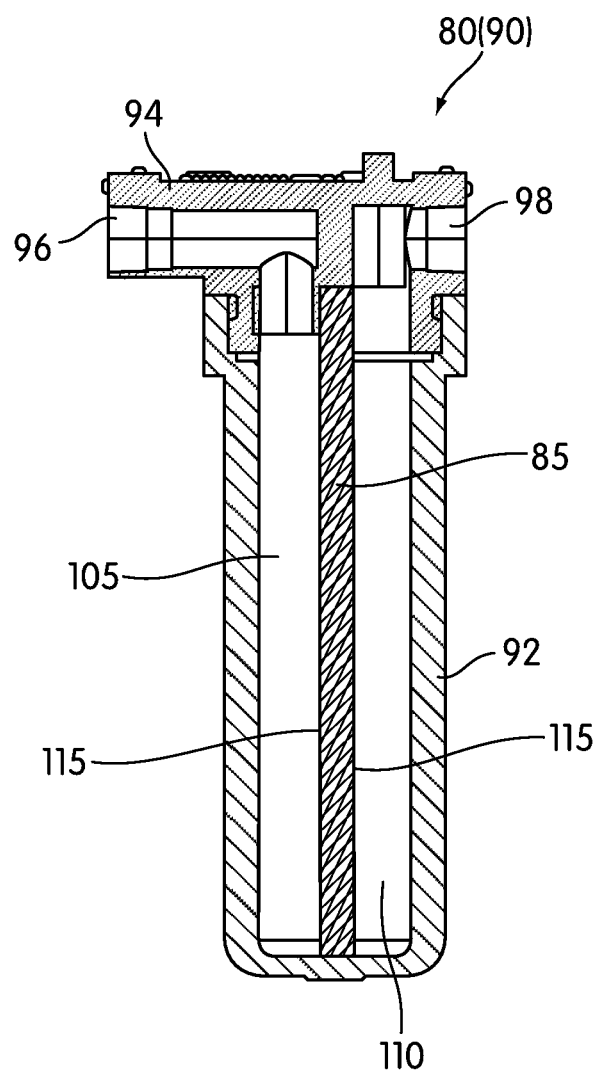
FIG. 12 shows another embodiment of an additive modulator connected into the flow channel of the electrochemical cell of the present invention.

In another embodiment, as seen in FIG. 12, the additive sorbent material 85 may not form a hollow body inside the reservoir base, but may instead form a wall separating the pre-modulated portion 105 of the reservoir 90 and the post-modulated portion 110 of the reservoir 90. In such an embodiment, the ionically conductive medium may flow into the reservoir 90 through the flow inlet 96, entering the pre-modulated portion 105. The medium may then pass through the wall of the additive sorbent material 85, into the post-modulated portion 110, before continuing to the flow outlet 98. In embodiments wherein the additive sorbent material 85 is constrained by screening material 115, the screening material 115 may also be shaped to form a wall between the pre-modulated portion 105, and the additive sorbent material 85, and between the additive sorbent material 85 and the post-modulated portion 110.

Figure 13:
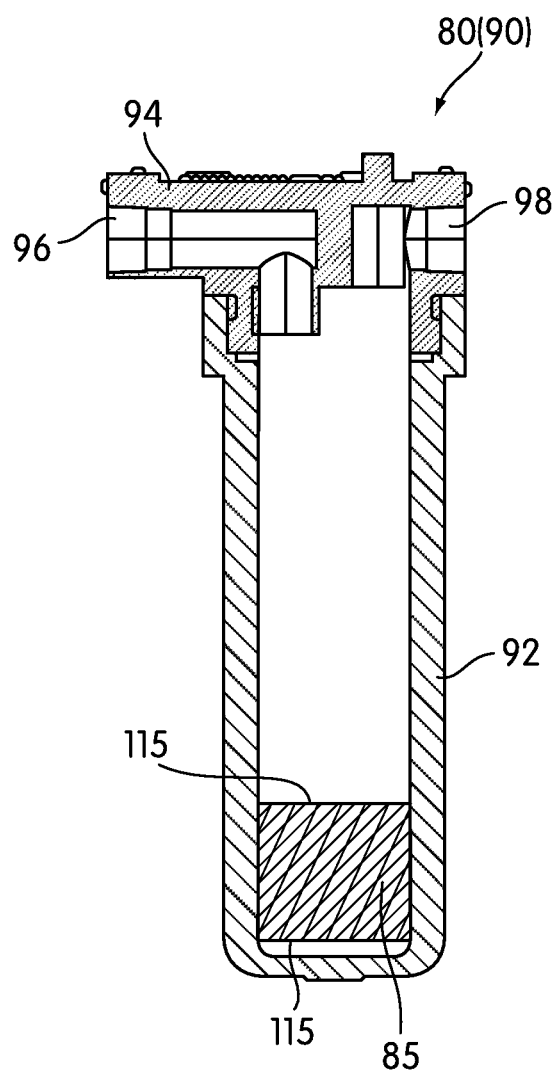
FIG. 13 shows another embodiment of an additive modulator connected into the flow channel of the electrochemical cell of the present invention.

In another embodiment, as seen in FIG. 13, the reservoir 90 may not have the distinct pre-modulated portion 105 and post-modulated portion 110. Instead, as shown, the ionically conductive medium may flow into the reservoir 90 through the flow inlet 96, and encounter the ionically conductive medium presently contained within the reservoir base 92. Inside the reservoir base 92 may be a mass of the additive sorbent material 85 that through equilibrium may modulate the concentration of additive in the ionically conductive medium in the reservoir base 92. In an embodiment, the mass of the additive sorbent material 85 may be contained within or surrounded by the screening material 115. The ionically conductive medium may then flow out of the reservoir base 92 through the flow outlet 98. In an embodiment the force of the flow from the flow inlet 96 into the reservoir base 92 may force the ionically conductive medium coming from the flow inlet 96 to contact the additive sorbent material 85, before reflecting back into the remainder of the reservoir base 92.

Figure 11:
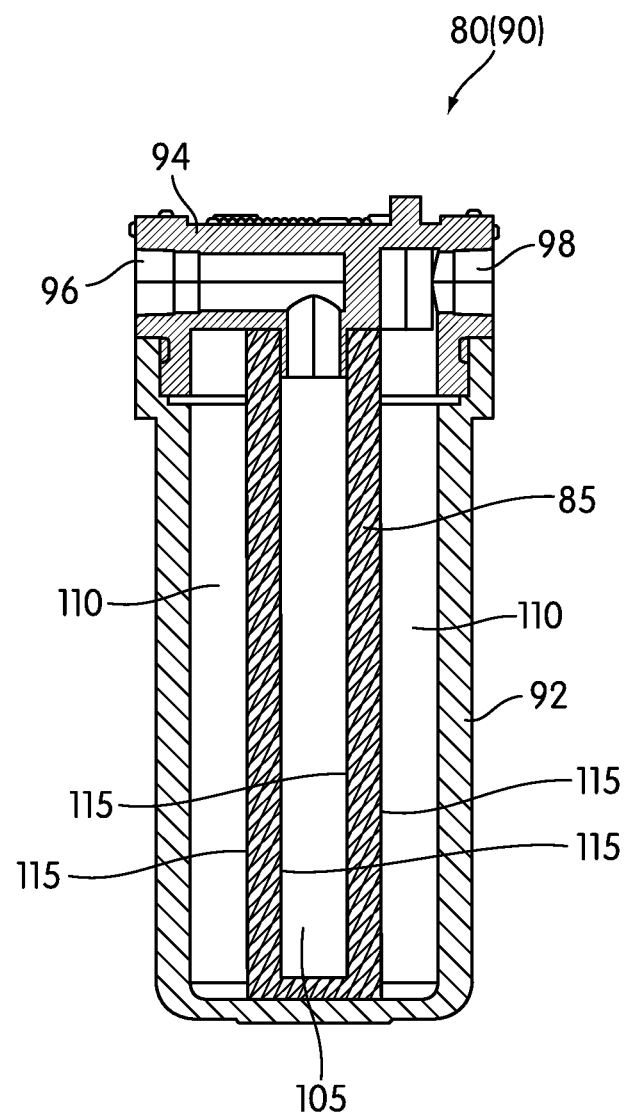
FIG. 11 shows an embodiment of an additive modulator connected into the flow channel of the electrochemical cell of the present invention.
Figure 14:
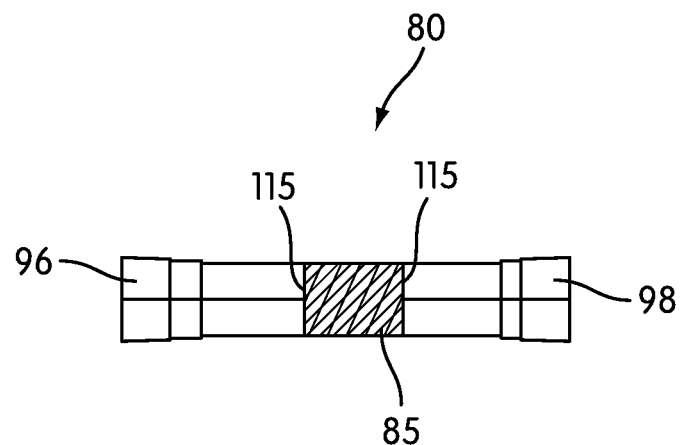
FIG. 14 shows an embodiment of an additive modulator placed within the flow channel connectors of the electrochemical cell of the present invention.
Figure 15:
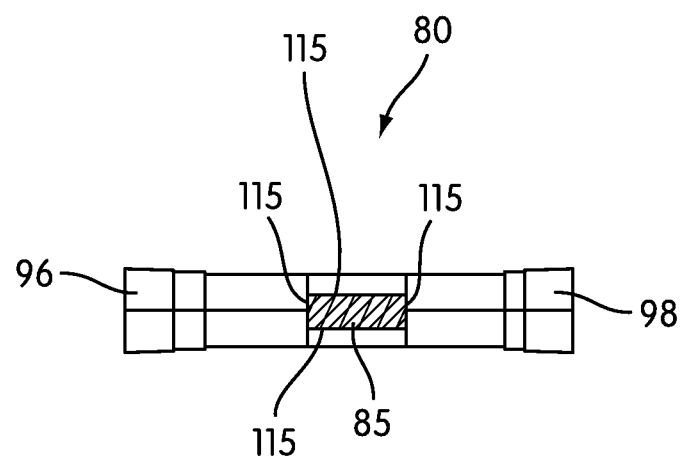
FIG. 15 shows another embodiment of an additive modulator placed within the flow channel connectors of the electrochemical cell of the present invention.
Figure 16:
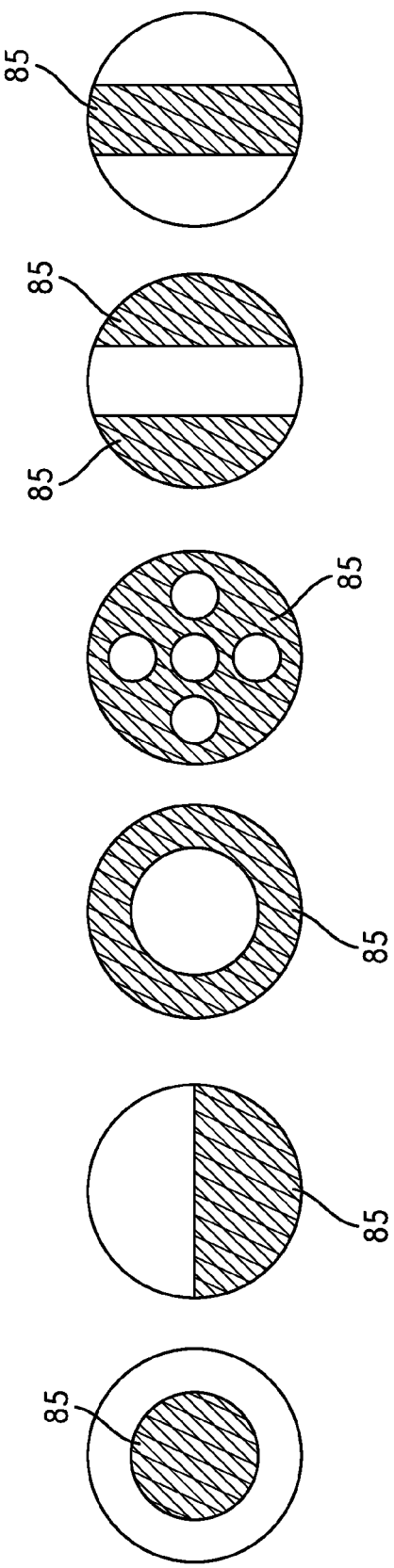
FIG. 16 shows various embodiments of the shape of an additive modulator placed within the flow channel connectors of the electrochemical cell of the present invention.

In the embodiments of the additive modulator 80 comprising a reservoir 90, such as, but not limited to those seen in FIGS. 11, 12 and 13, the reservoir cap 94 having the flow inlet 96 and flow outlet 98 may be on top of the reservoir base 92, so that a supply of ionically conductive medium forms to disperse the passage of the ionically conductive medium through the additive sorbent material 85. In other embodiments, the additive sorbent material 85 may simply serve as a screen directly between the flow inlet 96 and the flow outlet 98. Such an embodiment as that seen in FIG. 14, wherein the flow path is forced to flow through the additive sorbent material 85 between the flow inlet 96 and the flow outlet 98, may be desirable for reasons of simplicity where the flow of the ionically conductive medium is not severely dampened by the passage of the ionically conductive medium through the additive sorbent material 85. As seen in the illustrated embodiment, the additive sorbent material 85 may again be contained within the screening material 115. As the embodiment of FIG. 15 shows, the additive sorbent material 85 may be placed in the flow path such that it does not completely screen the ionically conductive medium, allowing the unrestricted passage of some of the ionically conductive medium through the additive modulator 80 during any given trip around the flow path. Again the screening material 115 may surround the additive sorbent material 85 in such an embodiment. FIG. 16 shows alternative non-limiting embodiments of the shape the additive sorbent material 85 as may be found in embodiments of the additive modulator 80 like those of FIGS. 14 and 15.

Such shapes may potentially reduce the effect of the presence of the additive sorbent material 85 on the speed and pressure of the flow, while still absorbing/adsorbing and releasing additive out of and into the ionically conductive medium. Such embodiments of the additive sorbent material 85 may adhere to the flow path by any suitable mechanism, including but not limited to friction, connective securements, interlocking shapes and mechanisms, and so on.

As indicated before, the foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims.

What is claimed is:

1. An electrochemical cell comprising:
   a fuel electrode for oxidizing a fuel;
   an oxidant electrode for reducing an oxidant;
   an ionically conductive medium for conducting ions between the fuel and oxidant electrodes to support electrochemical reactions at the fuel and oxidant electrodes;
   wherein the ionically conductive medium comprises at least one additive for enhancing at least one electrochemical reaction with the cell; and
   an additive sorbent material in contact with the ionically conductive medium and containing an additional amount of the additive, the additive sorbent material being configured to release the additional amount of the additive to the ionically conductive medium as a concentration of the additive in the ionically conductive medium is depleted during operation of the cell.

2. An electrochemical cell according to claim 1, further comprising a charging electrode selected from the group consisting of (a) the oxidant electrode and (b) a third electrode, the cell being rechargeable by applying a charging potential between the fuel electrode and the charging electrode such that the fuel electrode functions as a cathode for reducing and electrodepositing a reducible fuel species from the ionically conductive medium as the fuel on the fuel electrode and the charging electrode oxidizes an oxidizable oxidant species.

3. An electrochemical cell according to claim 2, wherein the at least one electrochemical reaction enhanced by the additive is the reduction and electrodeposition of the reducible fuel species on the fuel electrode during recharging, and wherein the additive is characterized by being depleted from the ionically conductive medium during the reduction and the electrodeposition of the fuel, thus reducing the concentration of the additive in the ionically conductive medium.

4. An electrochemical cell according to claim 3, wherein the additive is characterized by being depleted from the ionically conductive medium during recharging by being deposited together with the fuel,
   wherein the additive is also characterized by being released back to the ionically conductive medium by subsequent oxidation of the fuel, thus increasing the concentration thereof in the ionically conductive medium,
   the additive sorbent material being configured to absorb and/or adsorb the additive as the concentration thereof increases in the ionically conductive medium.

5. An electrochemical cell according to claim 1, wherein the additive comprises poly(ethylene glycol)tetrahydrofurfuryl.

6. An electrochemical cell according to claim 5, wherein the poly(ethylene glycol) tetrahydrofurfuryl is in a concentration of 0.5 mL/L to 4.0 mL/L.

7. An electrochemical cell according to claim 1, wherein the fuel is zinc and the ionically conductive medium comprises reducible zinc ions.

8. An electrochemical cell according to claim 2, wherein the fuel electrode comprises a series of permeable electrode bodies arranged in spaced apart relation,
   wherein the spaced apart relation of the permeable electrode bodies enables the charging potential to be applied between the charging electrode and at least one of the permeable electrode bodies, with the charging electrode functioning as the anode and the at least one permeable electrode body functioning as the cathode, such that the reducible fuel species are reduced and electrodeposited as the fuel in oxidizable from on the at least one permeable electrode body, whereby the electrodeposition causes growth of the fuel among the permeable electrode bodies such that the electrodeposited fuel establishes an electrical connection between the permeable electrode bodies.

9. An electrochemical cell according to claim 1, wherein the additive sorbent material comprises activated carbon.

10. An electrochemical cell according to claim 1, wherein the additive sorbent material is configured to contain an excess of 1.5-5.0× the amount of additive elsewhere in the electrolyte.

11. An electrochemical cell according to claim 1, further comprising a reservoir configured to house the additive sorbent material.

12. An electrochemical cell according to claim 11, wherein the reservoir is placed along a flow path of the ionically conductive medium.

13. An electrochemical cell according to claim 11, wherein the reservoir comprises a flow inlet portion and a flow outlet portion, separated by the additive sorbent material.

14. An electrochemical cell according to claim 1, wherein the additive sorbent material is shaped such that all of the ionically conductive medium must pass through the additive sorbent material to circulate a flow path for the ionically conductive medium.

* * * * *